(12) United States Patent
Johannes et al.

(10) Patent No.: US 12,545,066 B2
(45) Date of Patent: Feb. 10, 2026

(54) AUTONOMOUS TRAILER CONNECTIVITY

(71) Applicant: Outrider Technologies, Inc., Golden, CO (US)

(72) Inventors: Matthew Steven Johannes, Arvada, CO (US); Martin Edward Sotola, Boulder, CO (US); Jonathan Hovey Record, Highlands Ranch, CO (US); Gary Seminara, Golden, CO (US); John Keith Massie, Arvada, CO (US); Joseph S. DeRose, Denver, CO (US); Lawrence S. Klein, Bend, OR (US); Wylam J. Klein, Bend, OR (US)

(73) Assignee: Outrider Technologies, Inc., Brighton, CO (US)

( * ) Notice: Subject to any disclaimer, the term of this patent is extended or adjusted under 35 U.S.C. 154(b) by 600 days.

(21) Appl. No.: 17/984,078

(22) Filed: Nov. 9, 2022

(65) Prior Publication Data

US 2023/0145675 A1 May 11, 2023

Related U.S. Application Data

(60) Provisional application No. 63/277,562, filed on Nov. 9, 2021.

(51) Int. Cl.
*B60D 1/62* (2006.01)
*B60R 16/033* (2006.01)
(Continued)

(52) U.S. Cl.
CPC .............. *B60D 1/62* (2013.01); *B60R 16/033* (2013.01); *B62D 53/08* (2013.01); *H02J 7/35* (2013.01); *H02J 50/10* (2016.02)

(58) Field of Classification Search
CPC .. B60D 1/62; B60D 1/015; B60D 1/64; B60R 16/033; B62D 53/08; H02J 7/35; H02J 50/10
See application file for complete search history.

(56) References Cited

U.S. PATENT DOCUMENTS

| 3,603,860 | A | * | 9/1971 | Johnson | ................ | H02J 7/0045 |
| | | | | | | 320/109 |
| 3,896,415 | A | * | 7/1975 | Carter, III | .............. | B60Q 11/00 |
| | | | | | | 340/475 |

(Continued)

OTHER PUBLICATIONS

International Patent Application No. PCT/US2022/049439 International Search Report and Written Opinion dated Mar. 29, 2023, 22 pages.

(Continued)

*Primary Examiner* — Jason D Shanske
(74) *Attorney, Agent, or Firm* — Cozen O'Connor

(57) ABSTRACT

A trailer control box may receive a wireless message from a controller of the tractor. The trailer control box may validate and authenticating the message. The trailer control box may control an emergency-brake valve based on the message when the message is an emergency-brake command. The trailer control box may control a service-brake valve based on the message when the message is a service-brake command. The trailer control box may control at least one switch to operate trailer lights based on the message when the message is a light command. In certain embodiments, autonomous-capable socket is mounted to a trailer and includes: a chamfered outer casing, a plurality of electrical connectors, a service-brake air aperture, and an emergency-brake air aperture. The autonomous-capable socket required a single autonomous connection by an autonomous tractor.

19 Claims, 7 Drawing Sheets

(51) Int. Cl.
*B62D 53/08* (2006.01)
*H02J 7/35* (2006.01)
*H02J 50/10* (2016.01)

(56) References Cited

U.S. PATENT DOCUMENTS

| | | | | |
|---|---|---|---|---|
| 4,169,633 | A * | 10/1979 | Stearns | B60T 17/18 |
| | | | | 303/7 |
| 5,462,439 | A * | 10/1995 | Keith | B60L 1/12 |
| | | | | 439/246 |
| 8,215,436 | B2 | 7/2012 | DeGrave et al. | |
| 9,085,208 | B1 * | 7/2015 | Riibe | B60D 1/015 |
| 11,770,677 | B1 * | 9/2023 | Lesesky | H04W 4/42 |
| | | | | 455/456.1 |
| 2002/0021213 | A1 | 2/2002 | Ehrlich | |
| 2003/0141965 | A1 | 7/2003 | Gunderson et al. | |
| 2005/0065682 | A1 * | 3/2005 | Kapadia | G07C 5/085 |
| | | | | 701/36 |
| 2005/0146208 | A1 | 7/2005 | Wattenburg et al. | |
| 2010/0231163 | A1 | 9/2010 | Mashinsky | |
| 2011/0278820 | A1 * | 11/2011 | Riibe | B60D 1/62 |
| | | | | 280/422 |
| 2013/0271290 | A1 * | 10/2013 | Saenz | G05D 27/02 |
| | | | | 340/870.07 |
| 2017/0349055 | A1 * | 12/2017 | Kilic | B60L 53/35 |
| 2019/0111984 | A2 | 4/2019 | Bean et al. | |
| 2019/0202421 | A1 | 7/2019 | Healy | |
| 2019/0233034 | A1 | 8/2019 | Viele et al. | |
| 2019/0302764 | A1 | 10/2019 | Smith et al. | |
| 2020/0139950 | A1 | 5/2020 | James et al. | |
| 2020/0233410 | A1 | 7/2020 | Burns et al. | |
| 2020/0269822 | A1 | 8/2020 | Magzimof et al. | |
| 2021/0053407 | A1 | 2/2021 | Smith et al. | |
| 2021/0070139 | A1 * | 3/2021 | Schumacher | B60H 1/3222 |
| 2023/0021274 | A1 * | 1/2023 | Burchett | B60L 58/18 |
| 2025/0033719 | A1 * | 1/2025 | Rust | B60D 1/015 |

OTHER PUBLICATIONS

Park. "Smart Trailers Face a Huge Hurdle." Heavy Duty Trucking, Dec. 23, 2020, 4 pages.

* cited by examiner

AUTONOMOUS TRAILER CONNECTIVITY

RELATED APPLICATIONS

This application claims priority to U.S. Patent Application Ser. No. 63/277,562, titled "Autonomous Trailer Connectivity", filed Nov. 9, 2021, and incorporated herein by reference.

BACKGROUND

A conventional tractor physically couples to a trailer to move it. A king pin provides a mechanical coupling that transfers forces from the tractor to the trailer. A direct electrical coupling allows the tractor to control trailer lights, and two glad hand couplings transfer air from the tractor to the trailer to control trailer brakes.

SUMMARY

One aspect of the present embodiments includes the realization that autonomously connecting multiple glad hand couplings between an autonomous tractor and a conventional trailer is overly complex and may require manual intervention when an autonomous process fails to make the required couplings. The present embodiments solve this problem by providing a trailer with a trailer control box that includes a power source, compute node, and a wireless transceiver. The wireless transceiver allows a controller of the autonomous tractor to communicate with the trailer control box to control brakes and/or lights of the trailer without requiring a wired connection.

In certain embodiments, a trailer control box includes a power source, a wireless transceiver coupled with the power source, an air reservoir, an air compressor electrically coupled with the power source and fluidly coupled with the air reservoir, an emergency-brake valve fluidly coupling the air reservoir to an emergency air input of a brake actuator of a trailer, a service-brake valve fluidly coupling the air reservoir to a service air input of the brake actuator, and at least one compute node electrically coupled with the power source, the wireless transceiver, the emergency-brake valve, and the service-brake valve. The at least one compute node includes memory storing machine readable instructions that when executed by the at least one compute node, cause the trailer control box to: receive a brake control message from a device external to the trailer control box via the wireless transceiver, and control at least one of the emergency-brake valve and the service-brake valve based on the brake control message.

In certain embodiments, a trailer control box includes a power source, a wireless transceiver coupled with the power source, an emergency-brake switch electrically connected between the power source and emergency-brake input of an electrical brake actuator of a trailer, a service-brake switch electrically connected between the power source and a service-brake input of the electrical brake actuator, and at least one compute node coupled with the power source, the wireless transceiver, the emergency-brake switch, and the service-brake switch. The at least one compute node including memory storing machine readable instructions that when executed by the at least one compute node, cause the trailer control box to: receive a brake control message from a device external to the trailer control box via the wireless transceiver, and control at least one of the emergency-brake switch and the service-brake switch based on the brake control message.

In certain embodiments, a method for wirelessly controlling a trailer from a device external to the trailer includes receiving a message from a controller of the device, controlling an emergency-brake valve based on the message when the message is an emergency-brake command, controlling a service-brake valve based on the message when the message is an service-brake command, and controlling at least one switch to operate trailer lights based on the message when the message is a light command.

In certain embodiments, an autonomous-capable socket for a trailer includes an outer casing; a plurality of electrical connectors; a service-brake air aperture; and an emergency-brake air aperture.

DETAILED DESCRIPTION OF THE EMBODIMENTS

Figure 1:
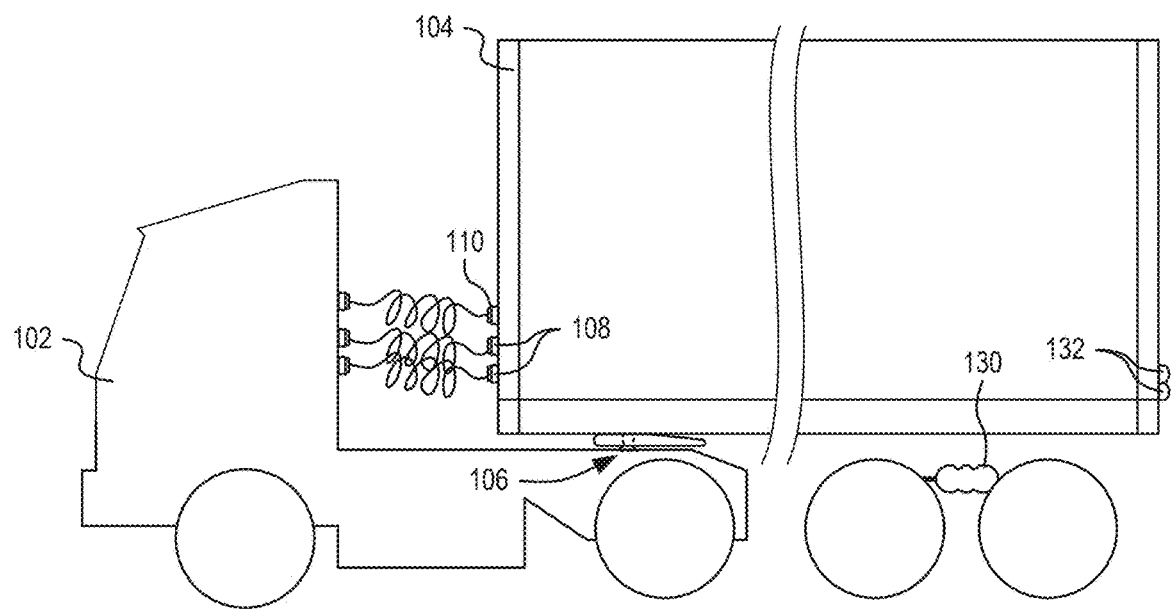
FIG. 1 is a schematic illustrating a conventional tractor hitched to a conventional trailer.

FIG. 1 shows a conventional tractor 102 hitched to a conventional trailer 104. A conventional king pin/fifth-wheel coupling 106 transfers forces from the tractor 102 to physically move the trailer 104. Brakes of trailer 104 are applied by a spring mechanism that requires an air supply from tractor 102 to cause a brake actuator 130 to release the brakes. Accordingly, tractor 102 requires at least one air coupling 108 to release brakes of trailer 104. Lights 132 (e.g., brake lights, tail lights, turn indicator lights, running lights, etc.) of trailer 104 are electrically operated by tractor 102 via an electrical coupling 110 that provides electrical power to illuminate the lights 132 as needed. Accordingly, these couplings 108 and 110 are made and broken each time the tractor 102 hitches/unhitches to/from the trailer 104.

Figure 2:
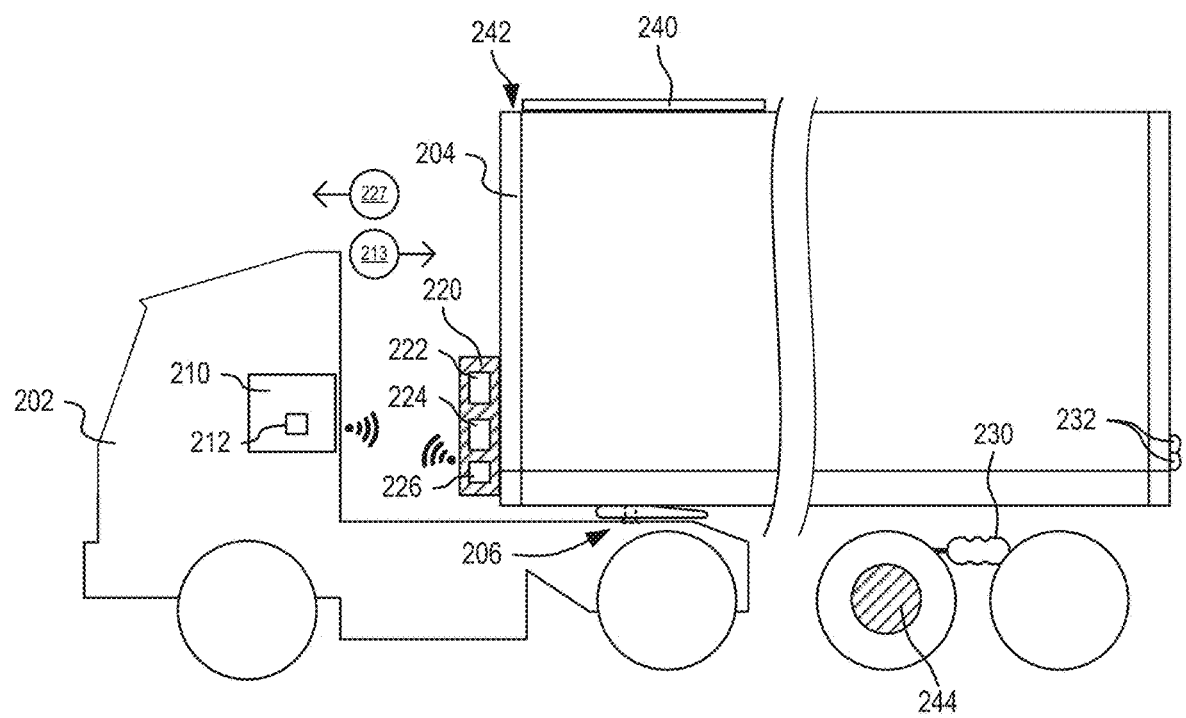
FIG. 2 is a schematic illustrating a tractor hitched to a trailer with wireless trailer connectivity, embodiments.

FIG. 2 shows an autonomous tractor 202 hitched to a wireless trailer 204. A conventional king pin/fifth-wheel coupling 206 transfers forces from the autonomous tractor 202 to physically move the wireless trailer 204. Emergency/parking brakes of wireless trailer 204 are applied by a spring, and wireless trailer 204 includes brake actuators that (a) compress the spring to release the emergency/parking brakes, and (b) apply the service-brakes. Autonomous tractor 202 includes a controller 210 and a wireless transceiver 212. Wireless trailer 204 includes a trailer control box 220 with a power source 222, a compute node 224 and a wireless transceiver 226. Compute node 224 includes at least one processor and memory storing firmware including machine-readable instructions that when executed by the processor cause compute node 224 to implement functionality described herein. Trailer control box 220 includes other components, described in detail below, that allow wireless trailer 204 to operate brake actuators 230 and lights 232 (e.g., brake lights, tail lights, turn indicator lights, running lights, etc.) without complex coupling for an air supply or electrical power from autonomous tractor 202. Only one brake actuator 230 is shown in FIG. 2 for clarity of illustration; however, wireless trailer 204 may have multiple brake actuators 230 (one for each set of brake drums, etc.).

Advantageously, wireless trailer 204 allows autonomous tractor 202 to hitch and move wireless trailer 204 without the complexity of making multiple physical couplings (e.g., couplings 108 and 110 of FIG. 1). Although shown positioned at the lower front end of wireless trailer 204, trailer control box 220 may be positioned elsewhere on wireless trailer 204 and/or may distributed across multiple positions without departing from the scope hereof.

Wireless transceiver 212 and wireless transceiver 226 implement a secure short-range wireless protocol (e.g., Bluetooth, Bluetooth LE, LoRa, Wi-Fi 802.11, ZigBee, InfraRed (IR), etc.) that allows controller 210 to instruct (e.g., using a wireless message 213) compute node 224 to operate brake actuator 230 and lights 232 using power from power source 222, thereby allowing tractor 202 to move trailer 204 without the complexity of making multiple couplings (e.g., couplings 108 and 110 of FIG. 1). Wireless transceiver 212 and wireless transceiver 226 may use one or more security protocols and/or encryption algorithms that ensure communications are secure.

Power source 222 provides electricity to operate electrical components (e.g., at least compute node 224, wireless transceiver 226, and lights 232) of wireless trailer 204 and may be implemented using one or more of a gas-powered generator, a diesel-powered generator, a rechargeable battery, a fuel cell, and/or any other type of device capable of providing electrical power to operate components of wireless trailer 204.

Figure 5A:
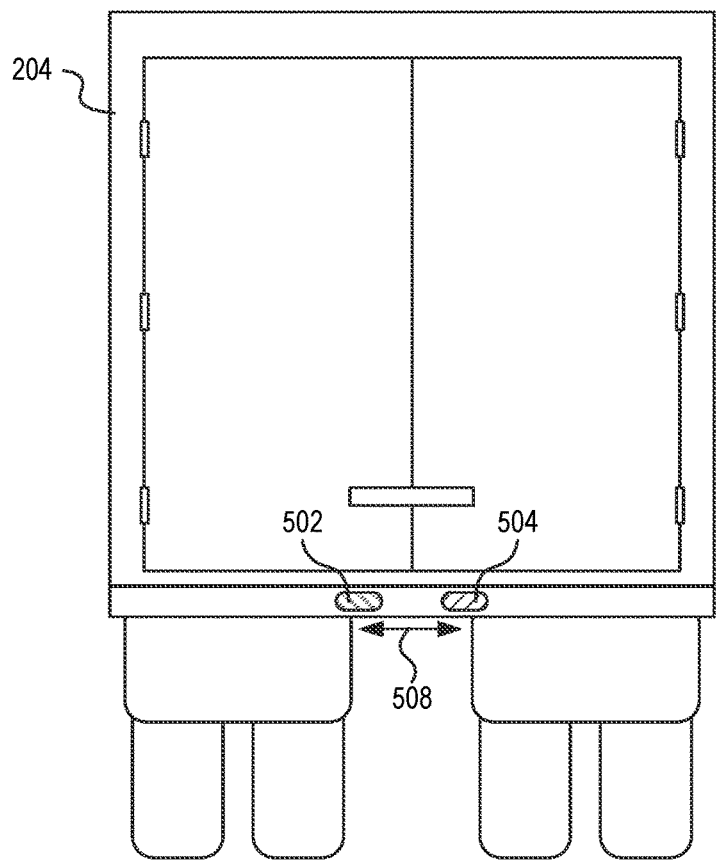
FIGS. 5A and 5B shows the wireless trailer of FIG. 2 configured with example contacts for coupling with example contacts of a loading dock to charge rechargeable batteries of the power source when the wireless trailer is at the loading dock, in embodiments.
Figure 5B:
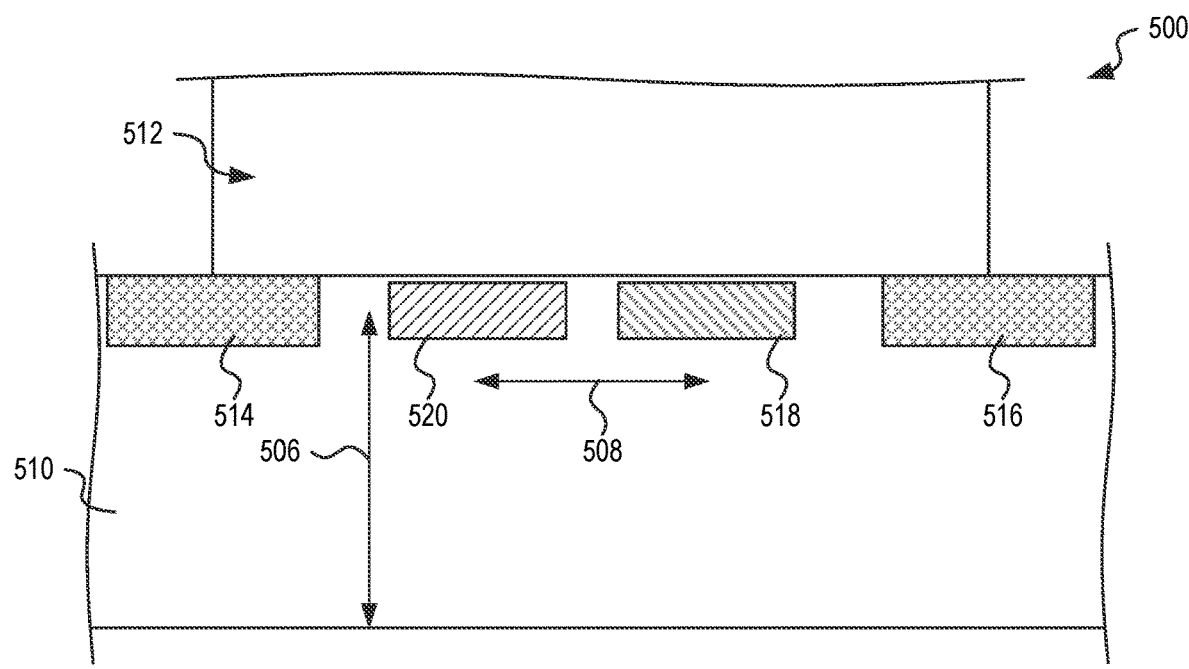

In one embodiment, where power source 222 includes at least one rechargeable battery, wireless trailer 204 may include solar panels 240 (e.g., positioned on a top surface 242 of wireless trailer 204) that charge the rechargeable battery when the solar panels receive sunlight. In another embodiment, where power source 222 includes at least one rechargeable battery, wireless trailer 204 may include a regenerative brake circuit 244 (e.g., coupled with a wheel and or axle of wireless trailer 204) that generates electrical power when brake actuator 230 applies the brakes and wireless trailer 204 is moving. In another embodiment, where power source 222 includes at least one rechargeable battery, wireless trailer 204 may include electrical contacts and/or an electro-magnetic coupling, that receive power when wireless trailer 204 is positioned at a dock, as shown in FIGS. 5A, 5B.

Figure 3:
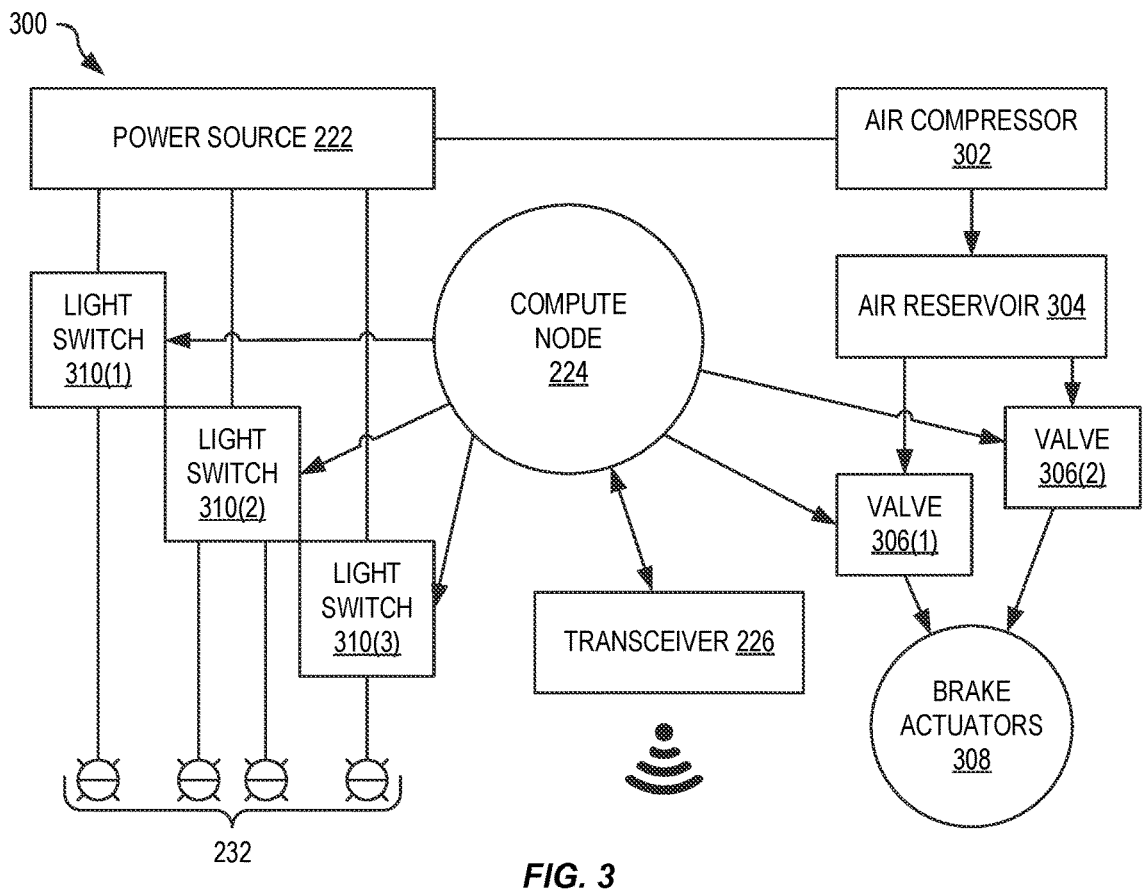
FIG. 3 is a schematic illustrating the trailer control box of FIG. 2 in further example detail for control of air operated brake actuators, in embodiments.

FIG. 3 is a schematic illustrating one example trailer control box 300 that represents trailer control box 220 of FIG. 2 implemented to control an air operated brake actuator 308 (e.g., brake actuator 230 of FIG. 2) of wireless trailer 204. Trailer control box 300 includes an air compressor 302 that maintains at least one air reservoir 304 with compressed air (e.g., at a pressure of between 90 psi and 150 psi) using power from power source 222. Trailer control box 300 may also include an air filter and/or an air dryer (not shown), in circuit with air compressor 302 and air reservoir 304, to condition the compressed air as needed. Trailer control box 300 also includes at least one valve 306 that fluidly couples brake actuators 308 to air reservoir 304. Valve 306 is controlled by compute node 224, based on instructions from controller 210 via transceivers 212 and 226, to allow air from air reservoir 304 to flow to brake actuator 308 and cause brakes of trailer 204 to disengage or engage as needed. In one embodiment, brake actuators 308 represent conventional spring/air operated brake actuators of trailer 204, and trailer control box 300 includes two valves 306(1) and 306(2), where valve 306(1) (also called an emergency-brake valve) couples to an emergency/parking brakes air inputs of brake actuators 308 and valve 306(2) (also called a service-brake valve) couples to a service-brake air input of brake actuators 308. Valve 306(1) may have two states; on or off. When on, valve 306(1) allows air from air reservoir 304 to flow to the emergency air input of brake actuators 308, thereby compressing the spring and releasing the emergency/parking brake of trailer 204. When off, valve 306(1) allows air to escape from the emergency air input of brake actuators 308, thereby causing the spring to apply the brake. Valve 306(2) provides proportional control of air flow from air reservoir 304 to the service air input of brake actuators 308, thereby providing proportional application of the service-brakes of trailer 204. Advantageously, valves 306 may be controlled via compute node 224 to generate emergency and service air supplies that are similar to conventional emergency and service air supplies received by conventional air couplings 108 of FIG. 1.

Trailer control box 300 also includes a plurality of light switches 310 controlled by compute node 224 to operate lights 232 of wireless trailer 204 using electrical power from power source 222. For example, power source 222 may include at least one electrical regulator that provides electrical current at the required voltage (e.g., twelve volts, twenty-four volts, etc.) to operate lights 232. Lights 232 controllably receive power from power source 222 via switches 310 as directed by controller 210 of tractor 202 via transceivers 212 and 226. Although shown with three switches 310(1)-(3) and four lights 232, trailer control box 300 may have more or fewer switches 310 to control more or fewer lights 232 without departing from the scope hereof. Each light 232 may connect with a different one of the switches 310, or certain lights 232 (e.g., multiple brake lights or multiple tail lights) may be connected in parallel with the same switch 310.

Figure 4:
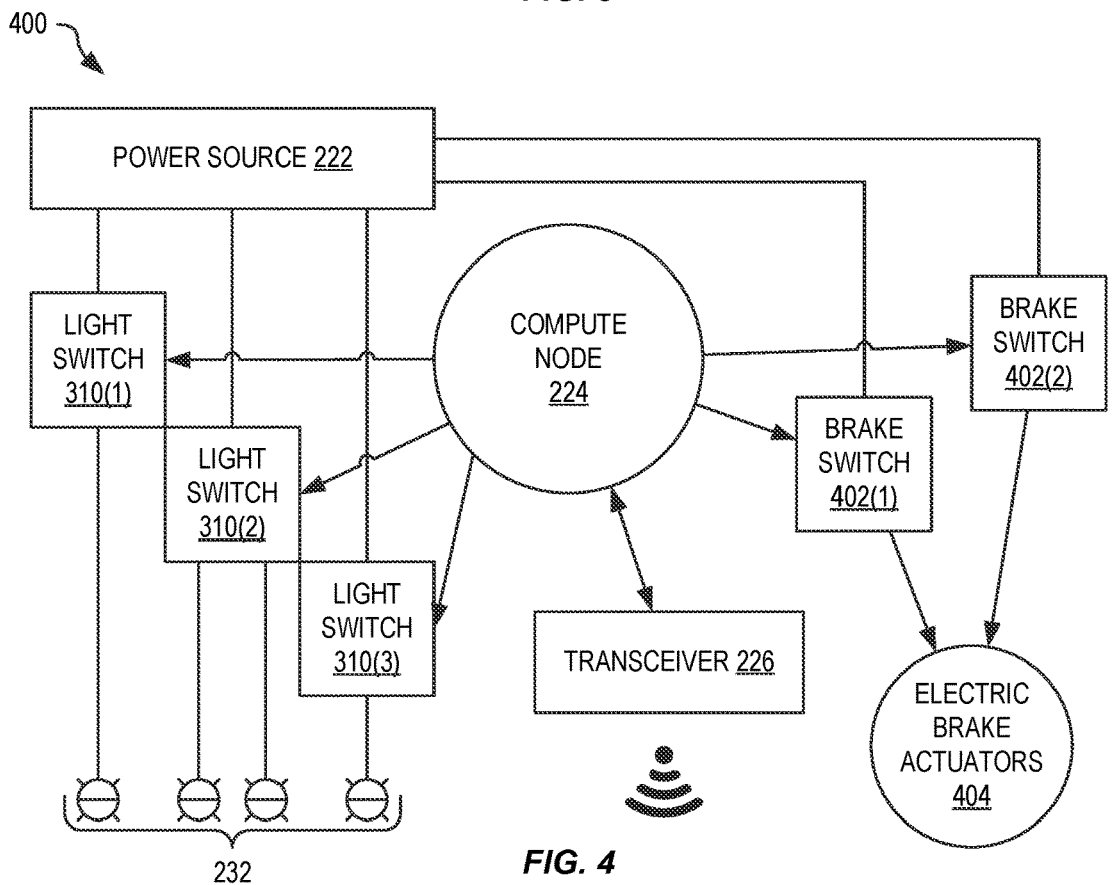
FIG. 4 is a schematic illustrating the trailer control box of FIG. 2 in further detail for control of electrically operated brake actuators, in embodiments.

FIG. 4 is a schematic illustrating one example trailer control box 400 that represents trailer control box 220 of FIG. 2 controlling an electrically operated brake actuator 404 of wireless trailer 204. Trailer control box 400 is similar to trailer control box 300, and description of like components and functionality are not repeated but are incorporated by reference where applicable. In this embodiment, trailer control box 400 may not include air compressor 302, air reservoir 304, or valves 306, but includes brake switches 402(1) and 402(2), controlled by compute node 224, that operate brake actuators 404. In this embodiment, brake actuator 404 mimics conventional air operated brake actuator 130, FIG. 1, by including a spring mechanism that applies the emergency/parking brakes of trailer 204, and an electrically powered mechanism that applies the service-brakes of trailer 204. Accordingly, brake actuator 404 includes an emergency/parking brake electrical input and a service-brake electrical input. That is, instead of requiring air pressure to oppose the spring, brake switch 402(1) is controlled to supply electrical power from power source 222 to the emergency/parking brake electrical input of electrically operated brake actuator 404 that causes the spring to be overridden, thereby releasing the emergency/parking brakes of trailer 204. Brake switch 402(2) is proportional (variable) and is controlled by compute node 224 to apply service-brakes of trailer 204. For example, brake switch 402(2) may provide a variable input to service-brake electrical input of brake actuator 404 that causes the service-brakes to be applied proportionally.

In certain embodiments, electrically operated brake actuator 404 may be controlled directly from tractor 202 through a wired connection (e.g., electrical coupling 110 of FIG. 1). In this embodiment, although the electrical coupling 110 is still required, the air couplings 108 are not required, thereby facilitating operation of the trailer by the tractor.

Although shown with trailer control box 300 controlling air operated brake actuator 308 and trailer control box 400 controlling electrically operated brake actuator 404, it is contemplated that trailer control box 200 may also control other forms of brake actuators, such as hydraulic brake actuators, without departing from the scope hereof.

Safety Features

In certain embodiments, trailer control box 220 is designed to conform to one or more automotive safety integrity level (ASIL) standards. For example, used protocols may include one or more of: Message counter, Handshaking, Heartbeat, Checksum, Masquerading, Redundant processing, and Power monitoring.

Figure 8:
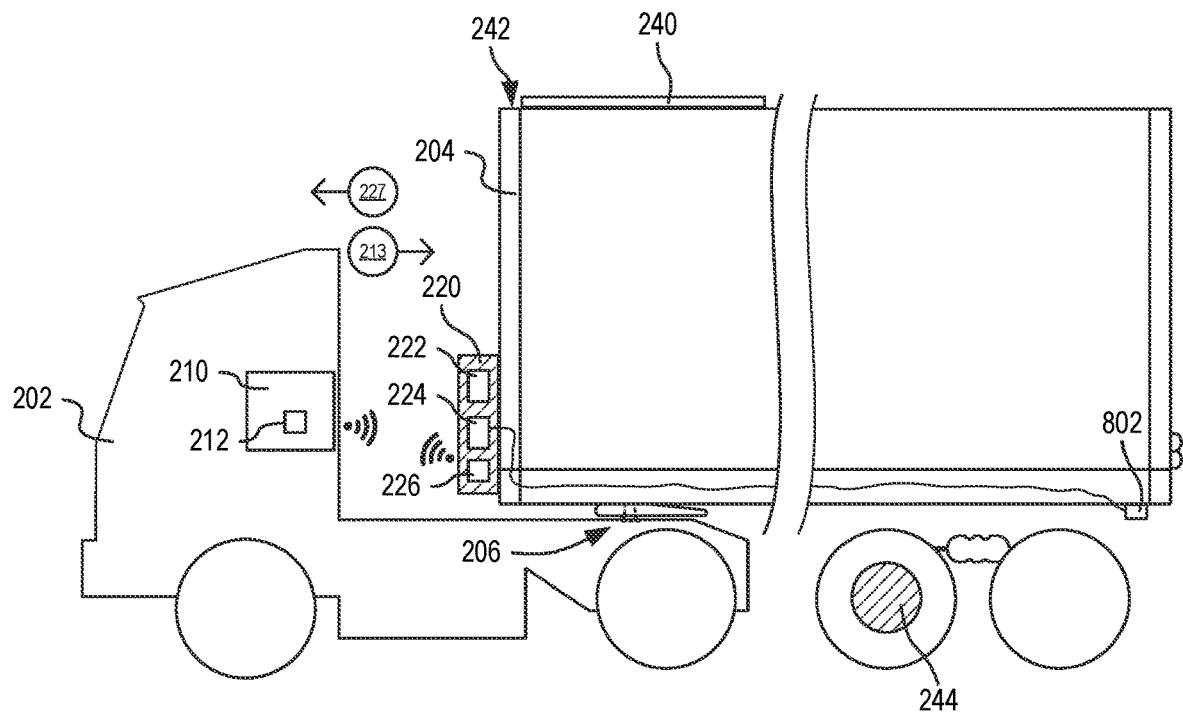
FIG. 8 is a schematic illustrating a tractor hitched to a trailer with wireless trailer connectivity and with rear facing sensors, in an embodiment.

FIG. 8 is a schematic illustrating a tractor hitched to a trailer with wireless trailer connectivity and with at least one rear facing sensor 802. Wireless trailer 204 may include one or more rear facing sensors 802, such as one or more of RADAR, LIDAR, cameras, etc. Rear facing sensor 802 is wired to compute node 224, whereby compute node 224 includes software that uses rear facing sensor 802 to detect objects behind wireless trailer 204 when tractor 202 is reversing wireless trailer 204, such as when reversing wireless trailer 204 into a loading dock and/or parking space. Rear facing sensor 802 may be recessed (e.g., for protection) beneath a chassis of wireless trailer 204, such as on each side and/or in the middle of the back end of wireless trailer 204. However, rear facing sensor 802 may be positioned elsewhere to have a rearward view from wireless trailer 204 without departing from the scope hereof In one example of operation, compute node 224 captures and processes sensor data from rear facing sensor 802 to detect objects positioned behind wireless trailer 204. For example, as tractor 202 reverses wireless trailer 204, compute node 224 processes sensor data from rear facing sensor 802 and wirelessly communicates warnings and/or distance measurements to detected objects to controller 210 of tractor 202. Thereby, trailer control box 220 enhances safety when wireless trailer 204 is being maneuvered by tractor 202. In embodiments where rear facing sensor 802 is a camera, compute node 224 may also send a video feed to controller 210 of tractor 202, or other devices external to trailer control box 220, via wireless transceiver 226.

As described below and shown in FIGS. 6A and 6B, connectivity between tractor 202 and a trailer may not be wireless but instead use wires or via a fifth-wheel 650 of tractor 202 including electrical contacts 604 and 606. In such embodiments, the at least one rear facing sensor 802 is electrically coupled with controller 210 that includes software for using rear facing sensor 802 to detect object behind the trailer when tractor 202 is reversing the trailer, such as when reversing the trailer into a loading dock and/or parking space.

Alternative Embodiments for Powering a Trailer

In the embodiments of FIGS. 2, 3, and 4, where power source 222 include rechargeable batteries, these rechargeable batteries require recharging to enable wireless trailer 204 to operate. Any trailer (not just wireless trailer 204) that uses power for other components (e.g., refrigeration units), may also benefit from receiving external power, such as when parked, which would save using carried fuel. As described above, and shown in FIG. 2, wireless trailer 204 may include solar panels 240 for charging the rechargeable batteries of power source 222. In certain embodiments, trailer control box 220 of FIG. 2 may be combined with a refrigeration unit to share a common power source. Compute node 224 may also control operation of the refrigeration unit, turning it on and off based on sensed temperature within trailer 204. Computer node 224 may also send a sensed temperatures to controller 210 of tractor 202, or other devices external to trailer control box 220, via wireless transceiver 226.

FIGS. 5A and 5B shows wireless trailer 204 of FIG. 2 configured with example contacts 502 and 504 for coupling with example contacts 518 and 520, respectively, of a loading dock 500 to charge rechargeable batteries of power source 222 when wireless trailer 204 is at loading dock 500. FIGS. 5A and 5B are best viewed together with the following description. Contacts 502 and 504 (e.g., charging plates) may be positioned elsewhere without departing from the scope hereof. These plates may include safety and/or security features that prevent risk of electrical shock.

FIG. 5A is a back view of wireless trailer 204 showing electrical contacts 502 and 504 positioned at a height 506 just below the deck height of wireless trailer 204 and with a horizontal spacing 508 that is centered to the trailer width. Loading dock 500 includes a dock wall 510, below a loading bay 512, with trailer bumpers 514 and 516. Contacts 518 and 520 are positioned at height 506 and with horizontal spacing 508 that is centered to loading bay 512. Contacts 502 and 504 and/or contacts 518 and 520 may be spring loaded. Accordingly, when wireless trailer 204 is positioned at loading dock 500, contacts 502, 504 connect with contacts 518, 520 to form an electrical circuit that charges the rechargeable battery of power source 222. For example, the power applied to contacts 518 and 520 may be low voltage and/or applied only when the electrical circuit is correctly formed by contacts 502 and 504. Although shown configure with loading dock 500, contacts 518 and 520 may be provided at a parking spot to provide power to wireless trailer 204 (or any contact equipped trailer). In one example, contacts 518 and 520 are positioned on a structure (e.g., posts, wall, and/or rail) at a back end of the parking spot. In another example, where parking spots for trailers are in a back-to-back double row layout, the structure may have contacts on each side.

In another embodiment, contacts 518 and 520 are replaced with a first electromagnetic coil and contacts 502 and 504 are replaced by a similar second electromagnetic coil (e.g., tuned to the first electromagnetic coil) such that electrical power may be transferred electromagnetically from loading dock 500 to wireless trailer 204 to charge the rechargeable battery of power source 222. These electromagnetic coils may be used to transfer electrical power to any trailer with electrically operated components.

Figure 6A:
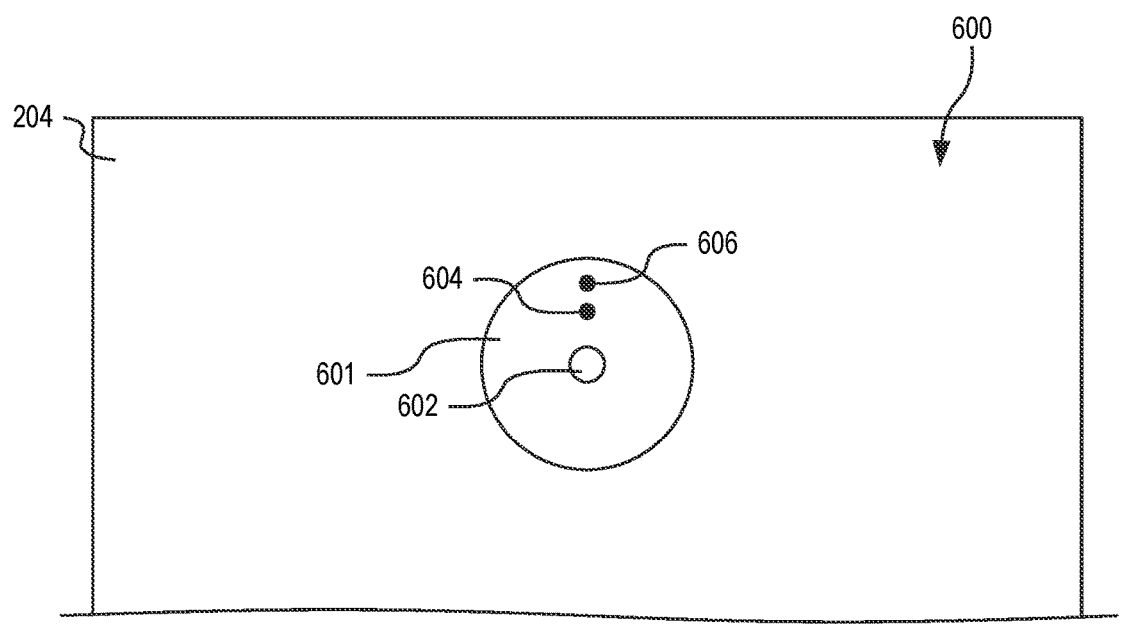
FIGS. 6A and 6B show example electrical connections between the tractor of FIG. 2 and the wireless trailer via a fifth wheel of the tractor, in embodiments.
Figure 6B:
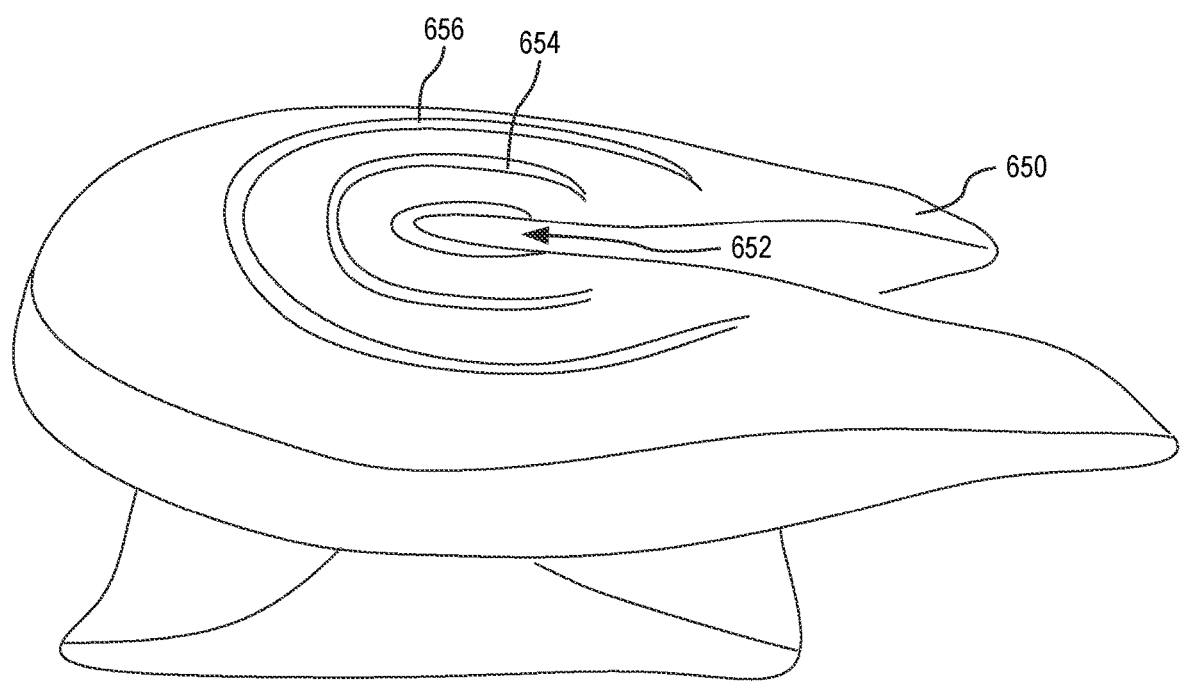

FIGS. 6A and 6B show example electrical connection between tractor 202 and wireless trailer 204 via a fifth-wheel 650 of tractor 202. This embodiment is used in place of the embodiments shown in FIGS. 5A and 5B. Although wireless trailer 204 is used as an example, these embodiments may provide electrical power to any trailer. FIGS. 6A and 6B are best viewed together with the following description. FIG. 6A is a schematic illustrating a front underside surface 600 of trailer 204, showing an electrical coupling plate 601 that is positioned around king pin 602 and includes two electrical contacts 604 and 606. FIG. 6B is a schematic illustrating one example fifth-wheel 650 with a slot 652 that captures king pin 602, and at least two embedded electrical slip rings 654, 656, that connect with contacts 604 and 606, respectively, of wireless trailer 204 when wireless trailer 204 is hitched to tractor 202. Each slip ring 654, 656 is electrically isolated from structure of fifth-wheel 650, and from each other, and is formed as a part circle centered around slot 652 and king pin 602. Accordingly, irrespective of the angle of wireless trailer 204 relative to tractor 202, contacts 604 and 606 remain connected with slip rings 654 and 656, respectively. Advantageously, when wireless trailer 204 is hitched with tractor 202, electrical power may be transferred from tractor 202 to charge rechargeable batteries of power source 222. In certain embodiments, slip rings and contacts are included to directly control individual electrical components of the trailer. For example, these lights and/or electrically operated brake actuators of the trailer may be directly controlled through the disclosed slip rings and contacts.

In an alternative embodiment, slip rings 654 and 656 are omitted and fifth-wheel 650 includes a first electromagnetic coil and coupling plate 601 includes a similar second electromagnetic coil (e.g., tuned to the first electromagnetic coil) such that electrical power may be transferred electromagnetically tractor 202 to wireless trailer 204 to charge the rechargeable battery of power source 222, or power any electrical component of the trailer.

Figure 7:
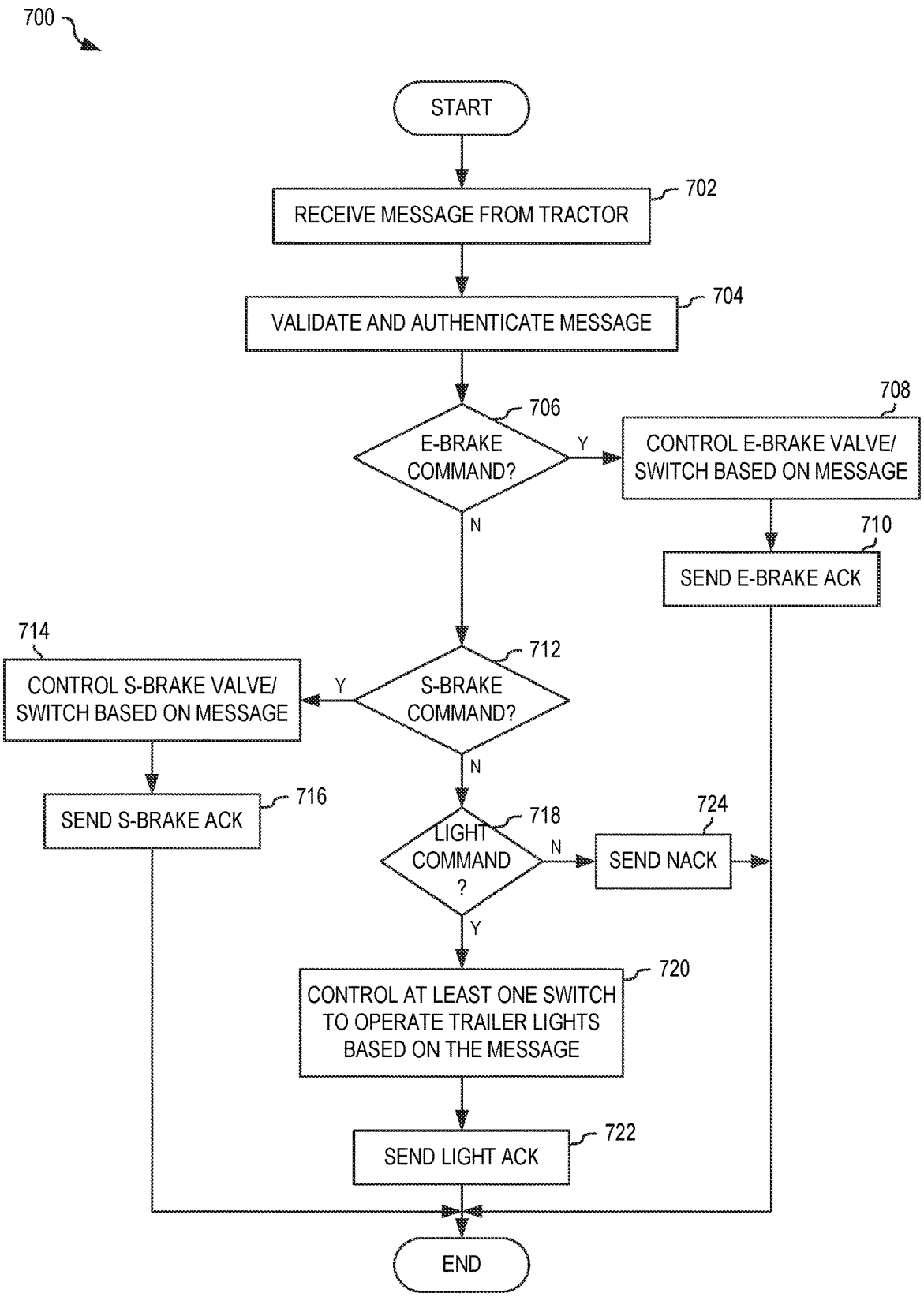
FIG. 7 is a flowchart illustrating one example method for wireless trailer connectivity, in embodiments.

FIG. 7 is a flowchart illustrating one example method 700 for wireless trailer connectivity. Method 700 is implemented in compute node 224 of trailer control box 220, FIG. 2, for example.

In block 702, method 700 receives a message from a tractor. In one example of block 702, transceiver 226 receives message 213 from controller 210, via wireless transceiver 212, of tractor 202. In block 704, method 700 validates and authenticates the message. in one example of block 704, compute node 224 evaluates one or both of a message counter and a checksum of message 213 and determines that message 213 is addressed to compute node 224 (e.g., include a unique trailer ID). Block 706 is a decision. If, in block 706, method 700 determines that a type of the message is an emergency-brake command, method 700 continues with block 708; otherwise, method 700 continues with block 712. In block 708, method 700 controls an emergency-brake valve/switch based on the command in the message. In one example of block 708, compute node 224 controls valve 306(1) to open when message 213 commands the emergency-brake off, thereby allowing compressed air from air reservoir 304 to flow into the emergency air input of brake actuator 308. In another example of block 708, compute node 224 controls switch 402(1) to open when message 213 commands the emergency-brake off, thereby providing power to electric brake actuators 404. In block 710, method 700 sends an e-brake acknowledgement to the tractor. In one example of block 710, compute node 224 controls transceiver 226 to send message 227 with an emergency-brake acknowledgement to controller 210 via transceiver 212. Method 700 then terminates and is invoked when a next message 213 is received.

Block 712 is a decision. If, in block 712, method 700 determines that a type of the message is a service-brake command, method 700 continues with block 714; otherwise, method 700 continues with block 718. In block 714, method 700 controls the service-brake valve/switch based on the message. In one example of block 714, compute node 224 controls valve 306(2) to proportionally control air pressure from air reservoir 304 to a service-brake air input of brake actuator 308 based upon a service-brake level defined within message 213, thereby causing brake actuator 308 to proportionally apply service-brakes of trailer 204. In another example of block 714, compute node 224 controls switch 402(2) to proportionally control electric brake actuators 404 to proportionally apply service-brakes of trailer 204. In block 716, method 700 sends an s-brake acknowledgement to the tractor. In one example of block 716, compute node 224 controls transceiver 226 to send message 227 with a service-brake acknowledgement to controller 210 via transceiver 212. Method 700 then terminates and is invoked when a next message 213 is received.

Block 718 is a decision. If, in block 718, method 700 determines that that a type of the message is a light command, method 700 continues with block 720; otherwise, method 700 continues with block 724. In block 720, method 700 controls at least one switch to operate trailer lights based on the message. In one example of block 720, compute node 224 controls one or more of switches 310 to illuminate or extinguish one or more lights 232 based on the light command within message 213. In block 722, method 700 sends a light acknowledgement to the tractor. In one example of block 722, compute node 224 controls transceiver 226 to send message 227 with a light acknowledgement to controller 210 via transceiver 212. Method 700 then terminates and is invoked when a next message 213 is received.

In block 724, method 700 sends a no-acknowledgment message to the tractor. In one example of block 724, compute node 224 controls transceiver 226 to send message 227 with a no-acknowledgement indication to controller 210 via transceiver 212. For example, method 700 may send the no-acknowledgment indication in one or more of the following situations: when message 213 is invalid, when message 213 does not authenticate, and when message 213 contains an unrecognized or invalid command. Method 700 then terminates and is invoked when a next message 213 is received.

Autonomous Capable Gladhands & Electrical Connections

U.S. Pat. No. 11,099,560 describes a tractor with an autonomous arm for automatically connecting the tractor gladhand to the connector on the trailer and further illustrates adapters for making such autonomous connections easier. For example, FIG. 65 of U.S. Pat. No. 11,099,560 shows a glad hand adapter arrangement 6500 having an integrated shuttle valve 6510 that does not dictate direct replacement of a stock trailer glad hand. Rather, the adapter arrangement 6500 employs a trailer-side glad hand 6520, which can be semi-permanently attached to the trailer glad hand connection. It is interconnected via an integral shuttle valve 6510 to a pair of ports 6530 and 6540 and the shuttle valve selectively routes pressurized air to the trailer-side glad hand 6520 from the connected port. The ports include a conventional truck side glad hand connector 6532 and a tool-engaged autonomous (e.g., nipple) connector 6542. Although this adapter improves autonomous connection, it only connects to a single air supply from the tractor.

Figure 9:
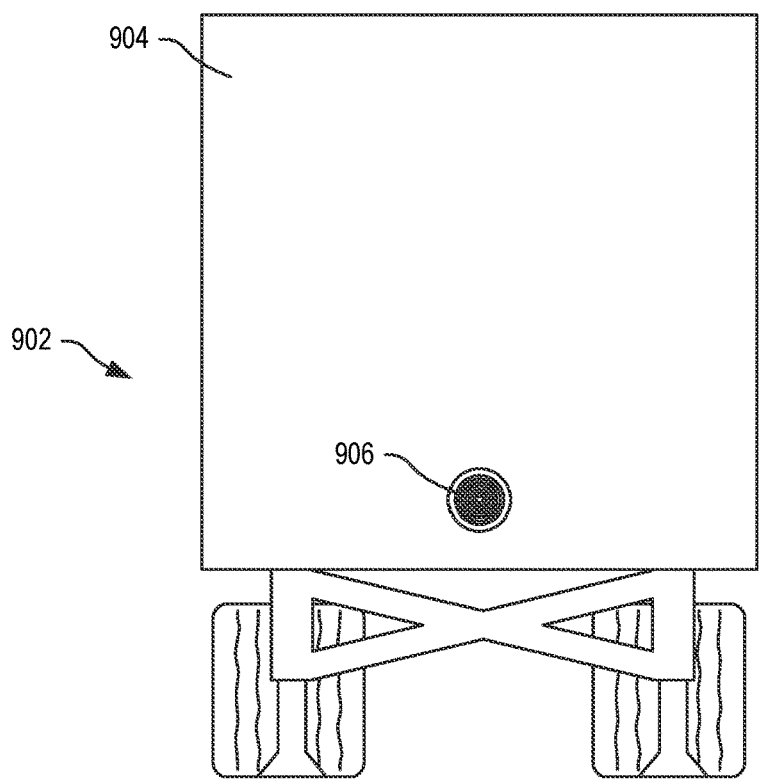
FIG. 9 is a schematic diagram illustrating a front end of a trailer fitted with an example autonomous-capable glad hand connector that combines two air and multiple electrical connections, in embodiments.

FIG. 9 is a schematic diagram illustrating a front end 902 of a trailer 904 fitted with an example single autonomous-capable socket 906 that combines two air and multiple electrical connections into a single connector. In general, conventional glad hand(s) are mounted in a panel located anywhere on, and typically along the lower portion of, front end 902. Autonomous-capable socket 906 replaces (or is included as well as) conventional gladhand (emergency air and service air) connections and electrical connector(s) that are used to provide air and electrical power to trailer 204. The conventional gladhand emergency air and service air connectors and the electrical connector provide a challenge for autonomous vehicles hitching to the trailer, since connecting to each of the conventional gladhand air connectors and the electrical connector is difficult to automate. The conventional electrical connector found on legacy trailers is particularly difficult to interface with autonomously because it has a spring-loaded cover that must be lifted before making the connection. One improvement to such electrical connectors to improve autonomous capability would be a mechanical lever that raises the spring-loaded cover during coupling.

Advantageously, autonomous-capable socket 906 is a single connector that includes with two independent air couplings and multiple electrical connections. The use of a single connector makes autonomous coupling easier than using multiple conventional glad hand air and electrical connectors. Where tractors are updated to include a corresponding single connector, autonomous-capable socket 906 may replace the conventional glad hand and electrical connectors on the trailer. However, where tractors with conventional multiple gladhand and electrical connectors will also couple with the trailer, autonomous-capable socket 906 may be added in parallel to the conventional glad hand and electrical connectors. Advantageously, autonomous-capable socket 906 provides autonomous mating capabilities while retaining current functionality for OTR drivers. Where an OTR tractor is adapted to couple with autonomous-capable socket 906, the operator has only to make a single connection when hitching to the trailer.

Autonomous-capable socket 906 may have a distinct shape that is easily detected by an autonomous system of the tractor, allowing an autonomous glad hand to be aligned with, and inserted into, autonomous-capable socket 906. In certain embodiments, autonomous-capable socket 906 may include one or more other features that facilitate the autonomous system of the tractor connecting thereto. For example, autonomous-capable socket 906 may include one or more fiducial markers (see FIG. 11) that are used by optical detection and alignment components of the autonomous system of the tractor to identify and determine pose of autonomous-capable socket 906. The fiducial markers may be one or more computer vision tags such as AR tag, ArUco tag, April tags, and so on. The autonomous-capable socket 906 may also, or alternatively, include at least one reflector at a known position, and/or may include RFID or other electromagnetic emitters (passive or active).

Autonomous-capable socket 906 may have one or more alignment features that assist with physical alignment and coupling during the connection process. For example, autonomous-capable socket 906 may include one or more of a chamfer, a hole, a pin, a surface draft, a contour, and other alignment features.

Where autonomous-capable socket 906 is provided as well as conventional gladhand couplings, the air supplies may couple through a shuttle valve that allows either air supply to provide air to trailer 904. In another embodiment, autonomous-capable socket 906 is similar to one or more of a quick disconnect fitting, a face seal, and may be compatible with an autonomous friendly gladhand (e.g., a gladhand that is designed for robotic arm manipulation). Accordingly, autonomous-capable socket 906 may operate in parallel or in addition to existing gladhands and electrical hookups on legacy trailers.

Figure 10:
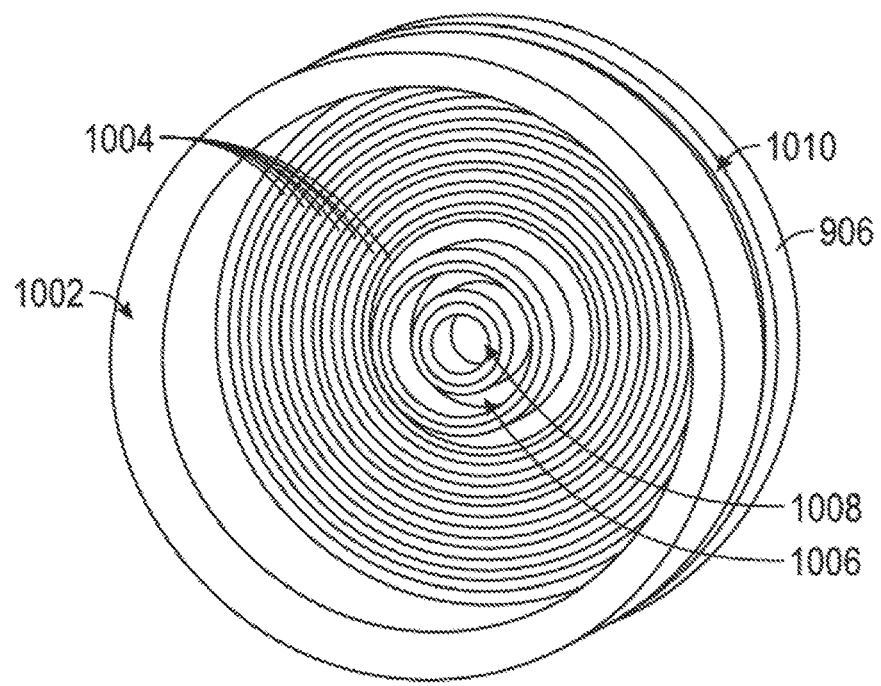
FIG. 10 shows the autonomous-capable socket of FIG. 9 in further example detail, in embodiments.
Figure 11:
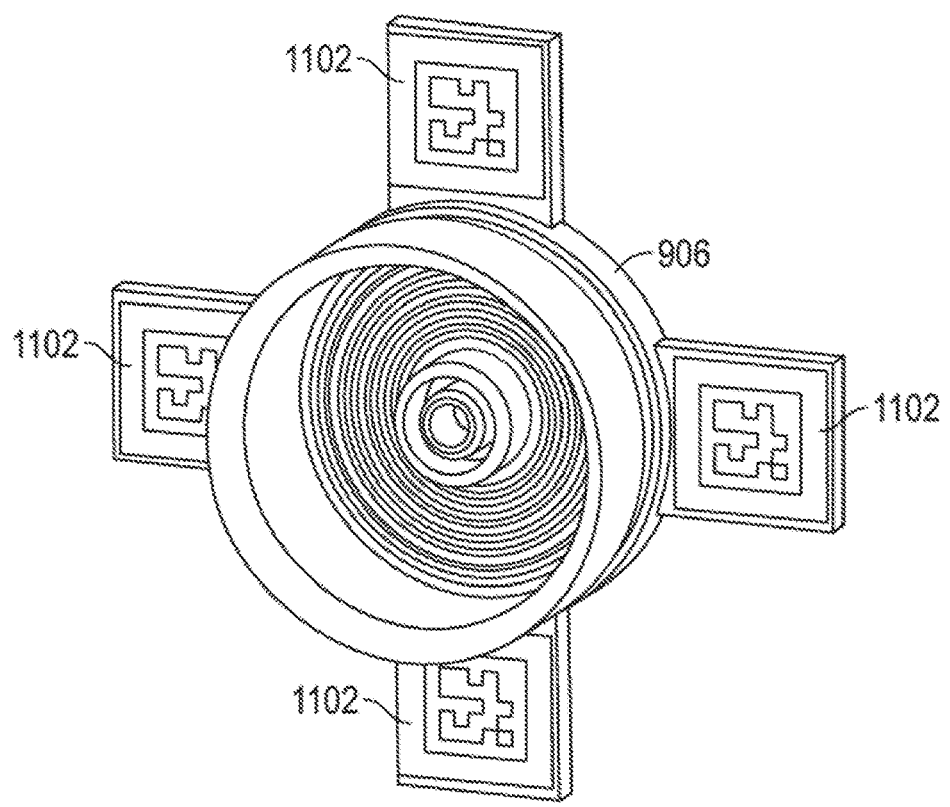
FIG. 11 shows the autonomous-capable socket of FIG. 9 with four fiducial markings that facilitate autonomous coupling, in embodiments.

FIG. 10 shows autonomous-capable socket 906 of FIG. 9 in further example detail. FIG. 11 shows autonomous-capable socket 906 with four fiducial markings 1102 that facilitate autonomous coupling. For example, the fiducial markings 1102 facilitate recognition of autonomous-capable socket 906 by computer vision of the robotic arm and facilitates alignment of the robotic arm to couple the autonomous friendly gladhand to autonomous-capable socket 906. Autonomous-capable socket 906 may have more or fewer fiducial markings 1102 without departing from the scope hereof In the embodiments shown in FIGS. 9, 10 and 11, autonomous-capable socket 906 is circular, having concentric contacts and apertures that allow for connection at any orientation. However, autonomous-capable socket 906 may be formed in other shapes without departing from the scope hereof.

In the example of FIG. 10, autonomous-capable socket 906 includes a chamfered outer casing 1002, a plurality of circular electrical contacts 1004, a service-brake aperture 1006 and an emergency-brake aperture 1008. Order, size and shape of each connector and aperture may vary without departing from the scope hereof. Chamfered outer casing 1002 may include a latch recess 1010 that allows an autonomous-capable plug (not shown) to latch in place.

Autonomous-capable socket 906 may have a latch mechanism that behaves similarly to conventional gladhand connections and decouples when excessive force is applied.

Combination of Features

Features described above as well as those claimed below may be combined in various ways without departing from the scope hereof. The following enumerated examples illustrate some possible, non-limiting combinations:

(A1) A trailer control box includes: a power source; a wireless transceiver coupled with the power source; an air reservoir; an air compressor electrically coupled with the power source and fluidly coupled with the air reservoir; an emergency-brake valve fluidly coupling the air reservoir to an emergency air input of a brake actuator of a trailer; a service-brake valve fluidly coupling the air reservoir to a service air input of the brake actuator; and at least one compute node electrically coupled with the power source, the wireless transceiver, the emergency-brake valve, and the service-brake valve and having memory storing machine readable instructions that when executed by the at least one compute node, cause the trailer control box to: receive a brake control message from a device external to the trailer control box via the wireless transceiver; and control at least one of the emergency-brake valve and the service-brake valve based on the brake control message.

(A2) In embodiments of (A1), the service-brake valve being proportional and capable of proportionally applying service-brakes of the trailer.

(A3) In either of embodiments (A1) or (A2), the device being a controller located on an autonomous tractor.

(A4) In any of embodiments (A1)-(A3), the power source comprising a rechargeable battery.

(A5) Any of embodiments (A1)-(A4) further including a solar charger unit for recharging the rechargeable battery.

(A6) Any of embodiments (A1)-(A5) further including a regenerative brake charger for recharging the rechargeable battery.

(A7) Any of embodiments (A1)-(A6) further including a fifth wheel electrical coupling plate with electrical contacts connectable with electrical bushes of a fifth wheel of a tractor to receive electrical power to charge the rechargeable battery.

(A8) Any of embodiments (A1)-(A7) further including a fifth wheel magnetic coupling plate for receiving electromagnetic energy from a tractor to charge the rechargeable battery.

(A9) Any of embodiments (A1)-(A8) further including a plurality of electrical switches each controllably coupling at least one of a plurality of lights to the power source, wherein each of the plurality of lights is mounted on the trailer; and the memory further comprising machine-readable instructions that when executed by the at least one compute node cause the trailer control box to:

(A10) Any of embodiments (A1)-(A9) further including at least one rear facing sensor positioned at a back end of the trailer and electrically coupled to the at least one compute node, the memory further storing machine readable instructions that when executed by the at least one compute node, cause the trailer control box to:

(A11) In any of embodiments (A1)-(A10), the memory further storing machine readable instructions that when executed by the at least one compute node, cause the trailer control box to send a video feed to the device external to the trailer control box via the wireless transceiver when the at least one rear facing sensor is a camera.

(A12) Any of embodiments (A1)-(A11) further including at least two first electrical contacts positioned at a rear end of the trailer and electrically connected to the power source, the at least two first electrical contacts electrically contacting at least two second electrical contacts positioned at a trailer loading dock or parking spot, wherein the at least two second electrical contacts provide power to the power source.

(A13) Any of embodiments (A1)-(A12) further including a first electromagnetic coil positioned at a rear end of the trailer for electromagnetically coupling with at a second electromagnetic coil positioned at loading dock or parking spot, wherein the second electromagnetic coil transfers electromagnetic power to the first electromagnetic coil to charge the power source.

(A14) Any of embodiments (A1)-(A13) further including a first electromagnetic coil positioned around a king pin of the trailer for electromagnetically coupling with a second electromagnetic coil embedded in a fifth-wheel of a tractor when the trailer is hitched to the tractor, wherein the second electromagnetic coil transfers power electromagnetically to the first electromagnetic coil to charge the power source.

(A15) In any of embodiments (A1)-(A14), the trailer control box is integrated with a refrigeration unit of the trailer to share a common power source.

(A16) In any of embodiments (A1)-(A15), the memory further storing machine readable instructions that when executed by the at least one compute node, cause the trailer control box to control operation of the refrigeration unit based on at least one temperature sensed within the trailer.

(A17) In any of embodiments (A1)-(A16), the memory further storing machine readable instructions that when executed by the at least one compute node, cause the trailer control box to send the at least one temperature to the device external to the trailer control box via the wireless transceiver.

(B1) A trailer control box includes: a power source; a wireless transceiver coupled with the power source; an emergency-brake switch electrically connected between the power source and emergency-brake input of an electrical brake actuator of a trailer; a service-brake switch electrically connected between the power source and a service-brake input of the electrical brake actuator; and at least one compute node coupled with the power source, the wireless transceiver, the emergency-brake switch, and the service-brake switch and having memory storing machine readable instructions that when executed by the at least one compute node, cause the trailer control box to: receive a brake control message from a device external to the trailer control box via the wireless transceiver; and control at least one of the emergency-brake switch and the service-brake switch based on the brake control message.

(B2) In embodiments of (B1), the device being a controller located on an autonomous tractor.

(B3) Either of embodiments (B1) or (B2) further including a plurality of electrical switches each controllably coupling the power source to at least one of a plurality of lights mounted on the trailer; and the memory further comprising machine-readable instructions that when executed by the at least one compute node cause the trailer control box to:

(B4) Any of embodiments (B1)-(B3) further including at least one rear facing sensor positioned at a back end of the trailer and electrically coupled to the at least one compute node, whereby the at least one compute node processes sensor data from the at least one rear facing sensor to detect objects positioned behind the trailer.

(B5) Any of embodiments (B1)-(B4) further including at least two first electrical contacts positioned at a rear end of the trailer and electrically connected to the power source, the at least two first electrical contacts electrically contacting at least two second electrical contacts positioned at a trailer loading dock or parking spot, wherein the at least two second electrical contacts provide power to the power source.

(B6) Any of embodiments (B1)-(B5) further including a first electromagnetic coil positioned at a rear end of the trailer for electromagnetically coupling with at a second electromagnetic coil positioned at a trailer loading dock or a parking spot, wherein the second electromagnetic coil transfers electromagnetic power to the first electromagnetic coil to charge the power source.

(B7) Any of embodiments (B1)-(B6) further including an electrical coupling plate positioned around a king pin of the trailer and having at least two first electrical contacts for electrically coupling with at least two second electrical slip rings embedded in a fifth-wheel of a tractor when the trailer is hitched to the tractor, wherein the at least two second electrical slip rings provide electrical power to the power source.

(B8) Any of embodiments (B1)-(B7) further including a first electromagnetic coil positioned around a king pin of the trailer for electromagnetically coupling with a second electromagnetic coil embedded in a fifth-wheel of a tractor when the trailer is hitched to the tractor, wherein the second electromagnetic coil transfers power electromagnetically to the first electromagnetic coil to charge the power source.

(C1) A method for wirelessly controlling a trailer from a device external to the trailer includes: receiving a message from a controller located at the device; controlling an emergency-brake valve based on the message when the message is an emergency-brake command; controlling a service-brake valve based on the message when the message is a service-brake command; and controlling at least one switch to operate trailer lights based on the message when the message is a light command.

(D1) An autonomous-capable socket for a trailer includes: an outer casing; a plurality of electrical connectors; a service-brake air aperture; and an emergency-brake air aperture.

(D2) In embodiments of (D1), the outer casing being chamfered.

(D3) In either of embodiments (D1) or (D2), the outer casing, the plurality of electrical connectors, the service-brake air aperture, and the emergency-brake air aperture being circular and concentric.

(D4) Any of embodiments (D1)-(D3) further including at least one fiducial marking to facilitate autonomous coupling of an autonomous friendly gladhand with the autonomous-capable socket, wherein the at least one fiducial marking provides identification of the autonomous-capable socket and facilitates visual alignment of the autonomous friendly gladhand with the autonomous-capable socket.

(D5) Any of embodiments (D1)-(D4) further including at least one of a reflector at a known position, an RFID emitter, a passive electromagnetic emitter, and an active electronic emitter.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A trailer control box, comprising:
a power source;
a wireless transceiver coupled with the power source;
an air reservoir;
an air compressor electrically coupled with the power source and fluidly coupled with the air reservoir;
an emergency-brake valve fluidly coupling the air reservoir to an emergency air input of a brake actuator of a trailer;
a service-brake valve fluidly coupling the air reservoir to a service air input of the brake actuator; and
at least one compute node electrically coupled with the power source, the wireless transceiver, the emergency-brake valve, and the service-brake valve and having memory storing machine readable instructions that when executed by the at least one compute node, cause the trailer control box to:
receive a brake control message from a device external to the trailer control box via the wireless transceiver; and
control at least one of the emergency-brake valve and the service-brake valve based on the brake control message.

2. The trailer control box of claim 1, the service-brake valve being proportional and capable of proportionally applying service-brakes of the trailer.

3. The trailer control box of claim 1, the device being a controller located on an autonomous tractor.

4. The trailer control box of claim 1, the power source comprising a rechargeable battery.

5. The trailer control box of claim 4, further comprising one or more of: a solar charger unit for recharging the rechargeable battery, a regenerative brake charger for recharging the rechargeable battery, a fifth wheel electrical coupling plate with electrical contacts connectable with electrical bushes of a fifth wheel of a tractor to receive electrical power to charge the rechargeable battery, and a fifth wheel magnetic coupling plate for receiving electromagnetic energy from the tractor to charge the rechargeable battery.

6. The trailer control box of claim 1, further comprising:
a plurality of electrical switches each controllably coupling at least one of a plurality of lights to the power source, wherein each of the plurality of lights is mounted on the trailer; and
the memory further comprising machine-readable instructions that when executed by the at least one compute node cause the trailer control box to:
receive a light control message from the device via the wireless transceiver; and
control one or more of the plurality of electrical switches based on the light control message.

7. The trailer control box of claim 1, further comprising at least one rear facing sensor positioned at a back end of the trailer and electrically coupled to the at least one compute node, the memory further storing machine readable instructions that when executed by the at least one compute node, cause the trailer control box to:
process sensor data from the at least one rear facing sensor to detect an object positioned behind the trailer; and
send a wireless message indicative of a distance to the object.

8. The trailer control box of claim 7, the memory further storing machine readable instructions that when executed by the at least one compute node, cause the trailer control box to send a video feed to the device external to the trailer control box via the wireless transceiver when the at least one rear facing sensor is a camera.

9. The trailer control box of claim 1, further comprising at least two first electrical contacts positioned at a rear end of the trailer and electrically connected to the power source, the at least two first electrical contacts electrically contacting at least two second electrical contacts positioned at a trailer loading dock or parking spot, wherein the at least two second electrical contacts provide power to the power source.

10. The trailer control box of claim 1, further comprising a first electromagnetic coil positioned at a rear end of the trailer for electromagnetically coupling with at a second electromagnetic coil positioned at loading dock or parking spot, wherein the second electromagnetic coil transfers electromagnetic power to the first electromagnetic coil to charge the power source.

11. The trailer control box of claim 1, further comprising a first electromagnetic coil positioned around a king pin of the trailer for electromagnetically coupling with a second electromagnetic coil embedded in a fifth-wheel of a tractor when the trailer is hitched to the tractor, wherein the second electromagnetic coil transfers power electromagnetically to the first electromagnetic coil to charge the power source.

12. The trailer control box of claim 1, wherein the trailer control box is integrated with a refrigeration unit of the trailer to share a common power source.

13. The trailer control box of claim 12, the memory further storing machine readable instructions that when executed by the at least one compute node, cause the trailer control box to control operation of the refrigeration unit based on at least one temperature sensed within the trailer.

14. The trailer control box of claim 13, the memory further storing machine readable instructions that when executed by the at least one compute node, cause the trailer control box to send the at least one temperature to the device external to the trailer control box via the wireless transceiver.

15. A trailer control box, comprising:
a power source;
a wireless transceiver coupled with the power source;
an emergency-brake switch electrically connected between the power source and emergency-brake input of an electrical brake actuator of a trailer;
a service-brake switch electrically connected between the power source and a service-brake input of the electrical brake actuator; and
at least one compute node coupled with the power source, the wireless transceiver, the emergency-brake switch, and the service-brake switch and having memory storing machine readable instructions that when executed by the at least one compute node, cause the trailer control box to:
receive a brake control message from a device external to the trailer control box via the wireless transceiver; and
control at least one of the emergency-brake switch and the service-brake switch based on the brake control message.

16. The trailer control box of claim 15, the device being a controller located on an autonomous tractor.

17. The trailer control box of claim 15, further comprising:
a plurality of electrical switches each controllably coupling the power source to at least one of a plurality of lights mounted on the trailer; and
the memory further comprising machine-readable instructions that when executed by the at least one compute node cause the trailer control box to:
receive a light control message from the device via the wireless transceiver; and
control at least one of the plurality of electrical switches based on the light control message.

18. The trailer control box of claim 15, further comprising at least one rear facing sensor positioned at a back end of the trailer and electrically coupled to the at least one compute node, whereby the at least one compute node processes sensor data from the at least one rear facing sensor to detect objects positioned behind the trailer.

19. The trailer control box of claim 15, further comprising one or more of:
(a) at least two first electrical contacts positioned at a rear end of the trailer and electrically connected to the power source, the at least two first electrical contacts electrically contacting at least two second electrical contacts positioned at a trailer loading dock or parking spot, wherein the at least two second electrical contacts provide power to the power source;
(b) a first electromagnetic coil positioned at the rear end of the trailer for electromagnetically coupling with at a second electromagnetic coil positioned at the trailer loading dock or parking spot, wherein the second electromagnetic coil transfers electromagnetic power to the first electromagnetic coil to charge the power source;
(c) an electrical coupling plate positioned around a king pin of the trailer and having at least two third electrical contacts for electrically coupling with at least two electrical slip rings embedded in a fifth-wheel of a tractor when the trailer is hitched to the tractor, wherein the at least two electrical slip rings provide electrical power to the power source; and
(d) a third electromagnetic coil positioned around the king pin of the trailer for electromagnetically coupling with a fourth electromagnetic coil embedded in the fifth-wheel of the tractor when the trailer is hitched to the tractor, wherein the fourth electromagnetic coil transfers power electromagnetically to the third electromagnetic coil to charge the power source.

* * * * *